(12) United States Patent
Smith (10) Patent No.: US 10,737,359 B2
(45) Date of Patent: Aug. 11, 2020

(54) MANUFACTURE OF AN ORIFICE PLATE FOR USE IN GAS CALIBRATION

(71) Applicant: Lam Research Corporation, Fremont, CA (US)

(72) Inventor: Dennis Smith, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 83 days.

(21) Appl. No.: 15/948,910

(22) Filed: Apr. 9, 2018

(65) Prior Publication Data

US 2019/0308286 A1 Oct. 10, 2019

(51) Int. Cl.
| | |
|---|---|
| *B23B 35/00* | (2006.01) |
| *B23K 26/382* | (2014.01) |
| *B23P 15/16* | (2006.01) |
| *C23C 8/10* | (2006.01) |
| *C23C 8/80* | (2006.01) |
| *G05D 7/06* | (2006.01) |

(52) U.S. Cl.
CPC ............... *B23P 15/16* (2013.01); *B23B 35/00* (2013.01); *B23K 26/382* (2015.10); *C23C 8/10* (2013.01); *C23C 8/80* (2013.01); *G05D 7/0629* (2013.01)

(58) Field of Classification Search
CPC ....... B23B 35/00; B23K 26/382; B23P 15/16; C23C 8/02; C23C 8/10; C23C 8/12; C23C 8/16; C23C 8/80; G05D 7/0629
See application file for complete search history.

(56) References Cited

U.S. PATENT DOCUMENTS

| | | | |
|---|---|---|---|
| 5,010,224 A | 4/1991 | Shirey et al. | |
| 5,016,024 A * | 5/1991 | Lam ...................... | B41J 2/1603 |
| | | | 29/890.1 |
| 5,086,655 A | 2/1992 | Fredericks et al. | |

(Continued)

FOREIGN PATENT DOCUMENTS

| | | | | |
|---|---|---|---|---|
| EP | 2883977 A1 * | 6/2015 | ............... | C23C 4/02 |
| WO | WO 2013/052728 | 4/2013 | | |

OTHER PUBLICATIONS

Byu. Oxide Growth Time Calculator. https://cleanroom.byu.edu/OxideTimeCalc.

(Continued)

*Primary Examiner* — Jacob J Cigna
(74) *Attorney, Agent, or Firm* — Weaver Austin Villeneuve & Sampson LLP (57) ABSTRACT

Methods and systems for preparing a hole having an accurately controlled area in an orifice plate for a mass flow controller are provided. Methods involve forming an initial hole in the orifice plate. The initial hole has an opening having an initial area. The orifice plate comprises a material that can react to form a coating on the orifice plate. The coating occupies a greater volume than the material consumed to form the coating. The material of the orifice plate is reacted with a reactant to produce the coating and thereby produce a reduced area hole having an opening with a reduced area that is smaller than the initial area. The reduced area hole is measured. A determined amount of the coating is removed from at least the reduced area hole to produce a final hole in the orifice plate, wherein the reduced area is smaller than an opening area of the final hole.

19 Claims, 9 Drawing Sheets

(56) References Cited

U.S. PATENT DOCUMENTS

| | | | |
|---|---|---|---|
| 5,277,783 A * | 1/1994 | Ohashi | B41J 2/162 |
| | | | 205/75 |
| 6,026,834 A | 2/2000 | Azima | |
| 6,158,679 A | 12/2000 | Ohmi et al. | |
| 6,290,331 B1 * | 9/2001 | Agarwal | B41J 2/14016 |
| | | | 347/45 |
| 6,315,394 B1 * | 11/2001 | Fujii | B41J 2/16 |
| | | | 347/54 |
| 6,363,958 B1 | 4/2002 | Ollivier | |
| 6,543,297 B1 | 4/2003 | Kleven | |
| 7,051,765 B1 | 5/2006 | Kelley et al. | |
| 7,815,787 B2 | 10/2010 | Chen et al. | |
| 7,871,737 B2 * | 1/2011 | Washima | H01M 8/0206 |
| | | | 205/122 |
| 8,828,213 B2 * | 9/2014 | Nagata | C25D 3/48 |
| | | | 205/118 |
| 10,017,862 B2 * | 7/2018 | Nagata | B05D 3/107 |
| 10,442,198 B2 * | 10/2019 | Higashibeppu | B41J 2/14 |
| 2002/0121274 A1 * | 9/2002 | Borland | A61M 5/30 |
| | | | 128/200.16 |
| 2003/0043233 A1 * | 3/2003 | Trunk | B41J 2/14072 |
| | | | 347/47 |
| 2005/0103748 A1 * | 5/2005 | Yamaguchi | H01L 21/31116 |
| | | | 216/67 |
| 2006/0078829 A1 * | 4/2006 | Toyota | B82Y 10/00 |
| | | | 430/315 |
| 2007/0097176 A1 * | 5/2007 | Hickey | B41J 2/162 |
| | | | 347/47 |
| 2009/0194027 A1 | 8/2009 | Heimel et al. | |
| 2013/0109113 A1 * | 5/2013 | Baldi | B41J 2/1433 |
| | | | 438/21 |
| 2016/0086845 A1 * | 3/2016 | Sakai | H01L 21/02057 |
| | | | 438/700 |
| 2018/0236767 A1 * | 8/2018 | Giovanola | B41J 2/1631 |

OTHER PUBLICATIONS

Bird Precision. "Welcome to Bird Precision." 2018. http://birdprecision.com/.

Emerson Electric Co. (2010) "Fundamentals of Orlflce Meter Measurement," *Daniel Measurement and Control White Papers.* [Retrieved on Apr. 10, 2018 from http://www.emerson.com/en-us/automation/daniel].

PCT International Search Report and Written Opinion dated Jul. 17, 2019 issued in PCT/US2019/025394.

* cited by examiner

MANUFACTURE OF AN ORIFICE PLATE FOR USE IN GAS CALIBRATION

BACKGROUND

Mass flow controllers (MFCs) automatically control the flow rate of a gas in accordance with a desired flow rate input into the MFCs, typically as an electric signal. Various types, or configurations, of MFCs are available, some of which rely on heat transfer to determine a flow rate of incoming gas. Others rely on a small hole, also referred to as an orifice, formed in a plate through which gas passes to produce a measurable pressure difference.

While these and other types of mass flow controllers are adequate for many applications, including traditional semiconductor device fabrication applications, they are increasingly unsuitable for semiconductor device deposition processes and etch processes that deliver gases to process chambers for advanced semiconductor fabrication processes. These advanced processes often produce features having line widths on the order of 20 nm or less. To improve processing of such features, particularly when multiple semiconductor wafers are processed simultaneously in different chambers or stations, flow control provided by conventional MFCs may need to be improved. Each MFC in a system should control gas flows identically and with a high degree of accuracy.

SUMMARY

Methods and systems for creating a hole in an orifice plate are provided. A method includes forming an initial hole in the orifice plate comprising a material. The initial hole has an initial area. The material of the orifice plate is reacted with a reactant to produce a coating and thereby produce a reduced area hole having a reduced area that is smaller than the initial area. The reduced area hole is measured. A determined amount of the coating is removed from at least the reduced area hole to produce a final hole in the orifice plate. The reduced area is smaller than an area of the final hole. The coating occupies a greater volume than the material consumed to form the coating.

In some embodiments, the method involves installing the orifice plate in a flow verification device for mass flow controllers.

In some embodiments, the method involves installing the orifice plate in a gas box for supplying gases to a semiconductor device fabrication reactor.

In some embodiments, the material of the orifice plate resists chemical reaction with gases passing through the final hole.

In some embodiments, the gases are selected from a group consisting of: Ar, $BCl_3$, $C_2F_6$, $C_2H_4$, $C_4F_8$, $C_4F_6$, $CF_4$, $CH_2F_2$, $CH_3F$, $Cl_2$, CO, CO2, COS, $H_2$, HBr, He, $N_2$, $NF_3$, $NH_3$, $O_2$, $SF_6$, $SiCl_4$, $SiF_4$, $SO_2$, Xe and $CF_3I$, and combinations thereof.

In some embodiments, the material of the orifice plate is selected from the group consisting of: silicon, molybdenum, germanium, and tungsten.

In some embodiments, the material of the orifice plate is silicon and the coating comprises silicon oxide.

In some embodiments, the method involves forming the initial hole in the orifice plate comprises laser drilling the initial hole in the orifice plate.

In some embodiments, the method further involves forming the initial hole in the orifice plate comprises by at least drilling the initial hole in the orifice plate.

In some embodiments, the initial area is greater than the area of the final hole.

In some embodiments, reacting the material of the orifice plate with the reactant comprises performing thermal oxidation of the material of the orifice plate.

In some embodiments, the material is silicon and the coating is thermally grown silicon dioxide.

In some embodiments, the method involves determining the determined amount of the coating using a difference between the reduced area and a specified area of the final hole.

In some embodiments, removing the determined amount of the coating from at least the reduced area hole comprises conducting a wet etch of the coating.

In some embodiments, the coating comprises silicon oxide and the wet etch comprises contacting the coating with an aqueous hydrofluoric acid solution.

In some embodiments, the final hole has a diameter of between about 50 micrometers and 1,800 micrometers.

In some embodiments, the final hole has a target diameter with a variance from the target diameter of no more than about 400 Angstroms.

In some embodiments, the final hole has a variance from a target diameter of no more than about 250 Angstroms.

In some embodiments, the method involves reacting the orifice plate to thereby increase the area of the final hole.

A system for preparing a hole in an orifice plate for a mass flow controller is disclosed. The system involves a drilling module configured to form an initial hole in the orifice plate. The initial hole has an initial area. The orifice plate comprises a material that can react to form a coating on the orifice plate. The coating occupies a greater volume than the material consumed to form the coating. A coating module is configured to react the material of the orifice plate with a reactant to produce the coating and thereby produce a reduced area hole having a reduced area that is smaller than the initial area. A measuring tool is configured to measure the reduced area hole. A wet etch tool is configured to remove determined amounts of the coating from at least the reduced area hole to produce a final hole in the orifice plate. The reduced area is smaller than an area of the final hole.

In some embodiments, the orifice plate has a size and shape suitable for installation in a mass flow controller.

In some embodiments, the material of the orifice plate is selected from the group consisting of silicon, molybdenum, and tungsten.

In some embodiments, the material of the orifice plate comprises silicon and the coating comprises silicon oxide.

In some embodiments, the initial area is greater than the area of the final hole.

In some embodiments, the reacting the material of the orifice plate with the reactant comprises performing thermal oxidation of the material of the orifice plate.

DETAILED DESCRIPTION

In the following description, numerous specific details are set forth to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that is the specific embodiments are not intended to limit the disclosed embodiments.

Introduction

When orifice-type mass flow meters (MFCs) are used for advanced semiconductor fabrication applications (e.g., creating and/or modifying features having dimensions of 20 nm or less), the dimensions of the orifice formed in a plate installed in the MFC should be produced with very tight tolerances. Existing techniques for fabricating holes with a high degree of accuracy, such as laser drilling and mechanical drilling, can produce holes with dimensions having variances in the range of +/−0.0002 times the diameter of the hole. However, for advanced semiconductor fabrication operations which may be particularly susceptible to tiny fluctuations in incoming process gas flow, MFCs using plates with holes with significantly less variance in diameter, or area, e.g., produced with a tighter tolerance threshold, would be desirable.

This disclosure provides methods and systems of producing small orifices with a very high degree of accuracy and precision. The orifices produced can be used for various applications, notably but not limited to, orifice plates for use in MFCs, flow splitters and gas calibration devices. Based on the disclosure provided herein, other applications will be apparent to those of skill in the art. Examples of such other applications include orifices for controlling pressure drop in a gas box used in the delivery path for process gases to a reaction chamber, for showerheads to deliver gas in semiconductor fabrication equipment, or for flow verification in calibrating mass flow controllers. In the last application, the orifice plate is used with a "standard" mass flow controller to identify how much gas flow passes through the orifice under a defined set of conditions for defined duration. Using these conditions, the orifice plate can calibrate other mass flow controllers. For convenience of explanation, the following discussion will focus on orifice plates for MFCs.

Definitions

The following terms are used intermittently throughout the instant disclosure:

"Orifice plate"—a plate having a small orifice therein. The orifice may be circular or another shape. The orifice plate may have a generally circular or other shape. In certain embodiments, an orifice plate is used in mass flow controller or other device for measuring fluid flow rate through a restricted area, such as across a pipe. Orifice plates may also be used for reducing pressure or for restricting flow and may be referred to, in such instances, as a "restriction plate." Either a volumetric or mass flow rate may be calculated depending on the particular implementation or configuration of an orifice plate in, for example, a MFC. Orifice plates may function using the same principle as a venturi nozzle, e.g. as explained by Bernoulli's principle which indicates a relationship between the pressure of a given fluid and the velocity of that fluid. For example, when the velocity of the fluid increases across a defined region, the pressure likewise decreases and vice-versa. The orifice plate contemplated in the instant disclosure may comprise silicon. The orifice plate may include a coating such as silicon oxide.

"Initial hole"—the opening, or orifice, initially formed to create a final hole in the orifice plate. The initial hole may be produced through traditional methods, such as by laser drilling, EDM, photographic processing, E-beam or mechanical drilling. In various processes for making an orifice plate, the initial hole is modified to produce a reduced area hole as part of the process for forming the final hole.

"Laser drilling"—refers to a process of repeatedly pulsing focused laser energy at a material, vaporizing the material layer by layer until a thru-hole is created, also referred to as a "popped" or "percussion drilled" hole. Depending upon physical characteristics of the material and material thickness, a "popped" hole formed via laser drilling may be as small as 0.002 in. in diameter.

"Mechanical drilling"—refers to a cutting process that uses a drill bit to cut a hole, typically with a circular or near circular cross-section, in solid materials. A drill bit used for mechanical drilling may be a rotary cutting tool, such as a multipoint tool.

"Opening"—referring to the hole, or orifice, formed in the orifice plate. The area of the opening, which may be circular or nearly circular, may regulate the amount of fluid, e.g. gas, which flows through the hole, e.g. across a defined area, or volume, per unit of time.

"Area"—the size of the opening, or orifice in units of length squared. The area of the orifice may be tightly controlled by the methods or systems disclosed herein to assist with advanced semiconductor fabrication processes. The area is used to characterize an opening regardless of the opening's shape. As explained elsewhere, some openings are circular, others are merely rounded (e.g., elliptically or oval shaped openings), other or polygonal, etc.

"Coating"—an outer layer provided on the orifice plate via a process such as thermal oxidation that may consume a portion of the substrate, e.g. the orifice plate, upon growth thereon. Thermal oxidation may be conducted in an oxidation furnace to coat the orifice plate with an oxide layer, e.g. silicon dioxide ($SiO_2$), to a desired thickness to reduce the area of the opening.

"Reduced area hole"—an opening formed upon coating the orifice plate with coating such as an oxide layer formed via thermal oxidation. The reduced area hole may be produced when a coating forms on the edges of an initial hole. The reduced area hole may have a specified area.

"Measuring"—a technique for determining a diameter, axis length, area, or other size parameter of a hole such as a reduced area hole. Measuring may be accomplished by traditional metrological techniques to determine the area or other size parameter of a hole to a high level of accuracy.

"Final hole"—the opening, or orifice, formed in the orifice plate with a desired area. Methods disclosed herein may be repeated as necessary to coat the orifice plate and to subsequently etch the coating, e.g. by a wet etch process, to shrink or enlarge the opening area as desired. In certain embodiments, the final hole is produced directly after coating an orifice plate and associated initial hole, or directly after etching an orifice plate and associated reduced area hole.

"Specified area"—a desired area of the opening that may be achieved by one or more coating and/or etch processes as disclosed herein.

"Wet etch"—a process that employs liquid chemicals to remove certain quantities of material from a given substrate, such as the oxide layer coated onto the orifice plate.

"Diameter"—any straight line segment that passes through the center of the opening and whose endpoints lie on the circle. However, aberrations in the formation of the opening, or orifice, in the orifice plate may lead to non-circular openings. Thus, diameter is used in an approximate context here, assuming that the actual near circular opening is circular for descriptive purposes. In some cases, a parameter other than diameter is used to characterize the size of a hole. Examples include major and/or minor axis (in the case of an ellipse), diagonal (in the case of a rectangle), and area (in the case of any shape).

Orifice Plate Example

Figure 1:
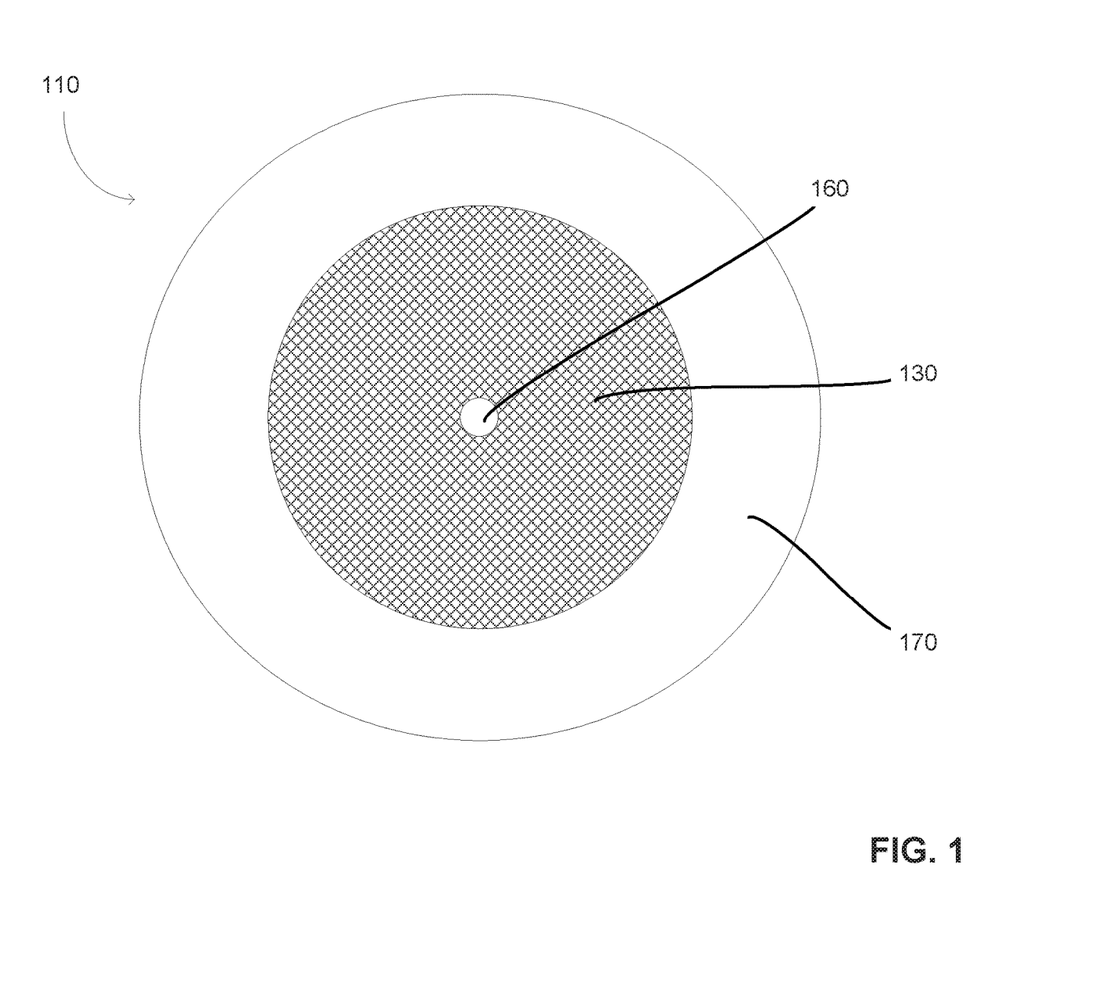
FIG. 1 is a plan view of an insert for a device used for flow verification while calibrating mass flow controllers.

FIG. 1 presents a plan view of an insert 110 for a multi-part device that may be used for various applications. As shown, insert 110 includes an orifice plate 130 with an opening or orifice 160. Throughout the remainder of this disclosure, orifice plates such orifice plate 130 and methods of making such plates and their holes are described. For some applications, the orifice plate 130 is fit in a metal frame or other structure 170 so that together they form a plate or other structure for an application such as controlling mass flow of a gas for calibration (flow verification), introducing pressure drop, or any of a number of other applications. When fitted, the orifice plate 130 and metal frame 170 form a gas tight or gasket seal; essentially no gas can pass through the interface between plate 130 and frame 170.

In certain embodiments, the outer diameter of orifice 160 is between about 50 to 1700 microns. In cases where the orifice is not circular, e.g., it is an oval, ellipse, or polygon, this dimension refers to length of the largest linear dimension in the opening. In certain embodiments, an orifice in an orifice plate such as orifice plate 130 has an outer diameter of about 1500 to 20,000 microns. If the orifice plate is not circular, this dimension refers to the largest linear dimension of the orifice plate. In embodiments employing an insert such as that shown in FIG. 1, a frame such as frame 170 has a largest linear dimension of between about 0.5 centimeter and 5 centimeters. For flow verification applications, the frame dimension may be about 0.5 to 2 centimeters.

Materials for an Orifice Plate

Materials selected for use in a substrate to manufacture orifice plate 130 shown in FIG. 1 or other structure with a hole or opening formed therein, should be resistant to chemical degradation from process gases flowing through opening 160. Chemical degradation may be defined as any type of reaction that consumes or degrades the structural integrity of the substrate material used for orifice plate 130. Corrosion is one type of such chemical reaction. Further, such selected materials should also demonstrate desirable wear resistance during exposure to high-velocity gases. Silicon is one such material. While gases flowed through an orifice meter are application dependent, examples of typical gases that can be used for semiconductor device fabrication include Ar, $BCl_3$, $C_2F_6$, $C_2H_4$, $C_4F_8$, $C_4F_6$, $CF_4$, $CH_2F_2$, $CH_3F$, $Cl_2$, CO, $CO_2$, COS, $H_2$, HBr, He, $N_2$, $NF_3$, $NH_3$, $O_2$, $SF_6$, $SiCl_4$, $SiF_4$, $SO_2$, Xe and $CF_3I$.

In addition to being resistant to chemical degradation, substrate material selected for manufacture of orifice plate 130 should also be capable of being chemically modified to produce a coating. The coating should occupy a relatively greater volume than the material consumed from the orifice plate 130. For some materials, the coating is producible in a manner that provides a uniform thickness over the flat surface of an orifice plate as well as in the side walls of an initial hole. Highly diffusion-limited reactions are often suitable for this purpose. Oxidation reactions are commonly used to produce the coating, however methods and systems for implementing the disclosed embodiments are not limited to oxidation reactions. A typical example of a suitable oxidation reaction used to produce a coating on the substrate for orifice plate 130 includes oxidation of silicon (Si) to produce silicon dioxide ($SiO_2$), a desirable coating material to restrict or adjust the size of opening 160 dependent on process needs. In addition to silicon, examples of suitable material for the substrate used to manufacture orifice plate 130 include certain metals such as germanium (Ge), tungsten (W) molybdenum (Mo), gallium arsenide (GaAs), and tin (Sn). Further, in circumstances when Si is selected as the material of choice for manufacture of orifice plate 130, the Si used may have any of various morphologies including amorphous, polycrystalline, or single-crystal morphology.

Example of an Orifice Plate Generation Process Flow

Figure 2:
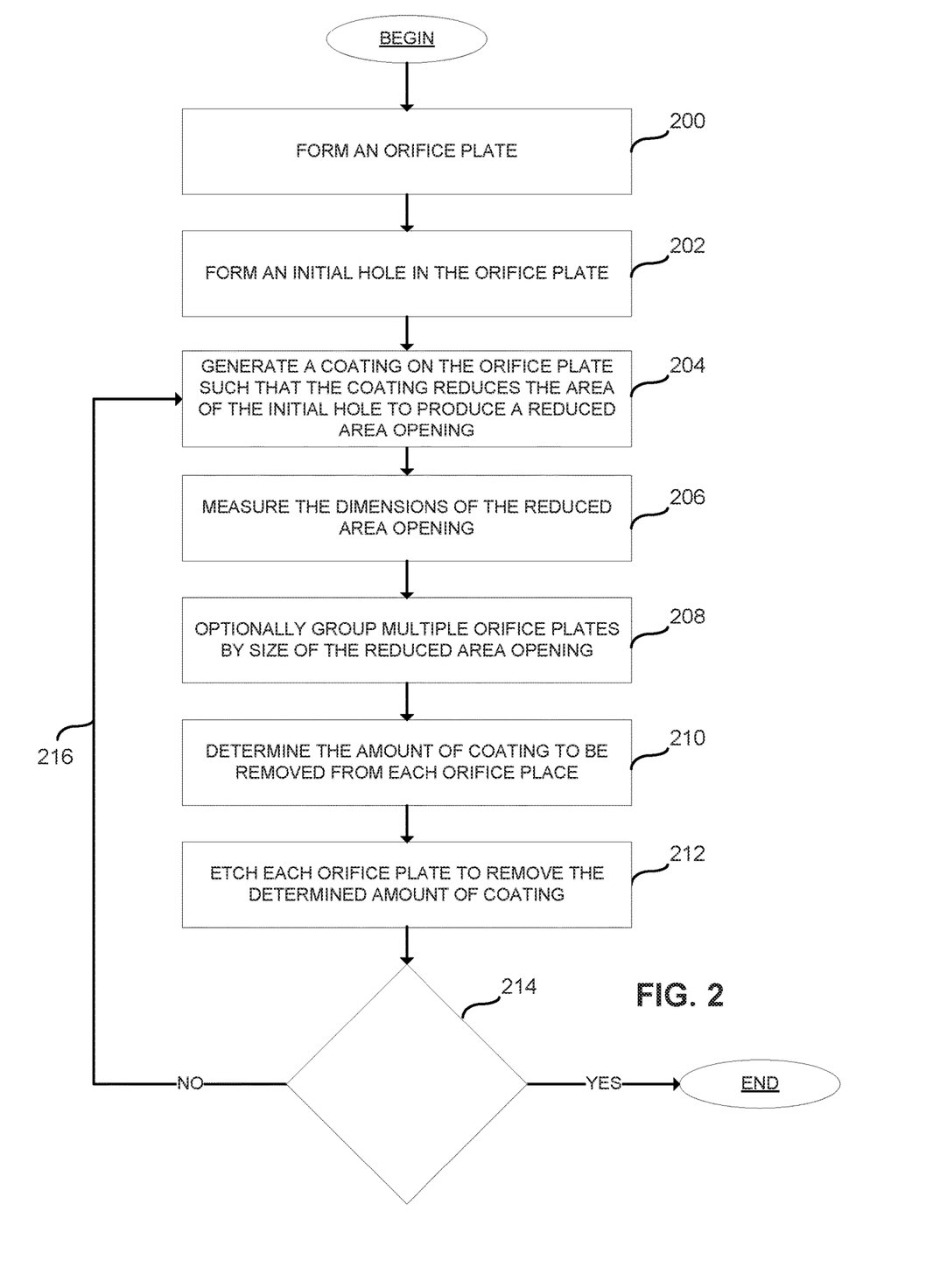
FIG. 2 is a process flow diagram of operations performed in accordance with disclosed embodiments.

FIG. 2 shows a process flow diagram for fabricating an orifice plate having a final hole having an area or other dimension at a very high tolerance (e.g., about +/− about 300 Å). The process flow tracks the sequence of orifice plate drawings shown in FIGS. 3A-8C. Upon beginning the process shown in FIG. 2, an orifice plate is formed at operation 200. A variety of manufacturing and/or fabrication techniques may be used to form, cut, or otherwise alter the dimensions of a raw, unprocessed, substrate to the dimensions of an orifice plate or other structure suitable for having a hole drilled therein for gas flow regulation when installed in, for example, a MFC. In some cases, the substrate comes in a size and shape suitable for an orifice plate and no manufacturing modification is needed. For example, a circular wafer such as a single crystal silicon wafer of appropriate size may be employed. Materials, such as silicon, selected for use in the substrate for formation of the orifice plate should be resistant to chemical degradation from process gases contacting and passing through the hole during operation of a MFC using the orifice plate. Also, as explained, the substrate material should be capable of being chemically modified to produce a coating that occupies a greater volume than the material consumed to make the coating from the substrate. Formation of exemplary orifice plates 400 is shown in greater detail in FIGS. 3A-3C.

Figure 4A:
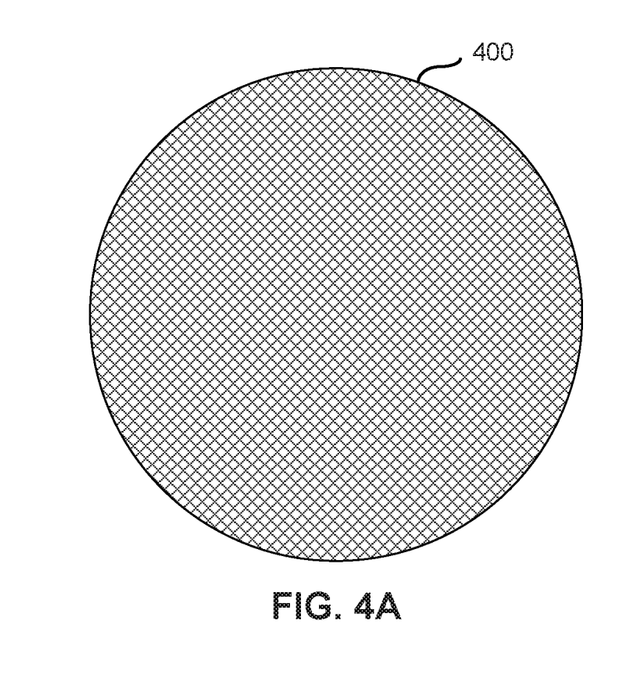
FIGS. 4A-4B and 4C are top and side views of an orifice plate, respectively.
Figure 4B:
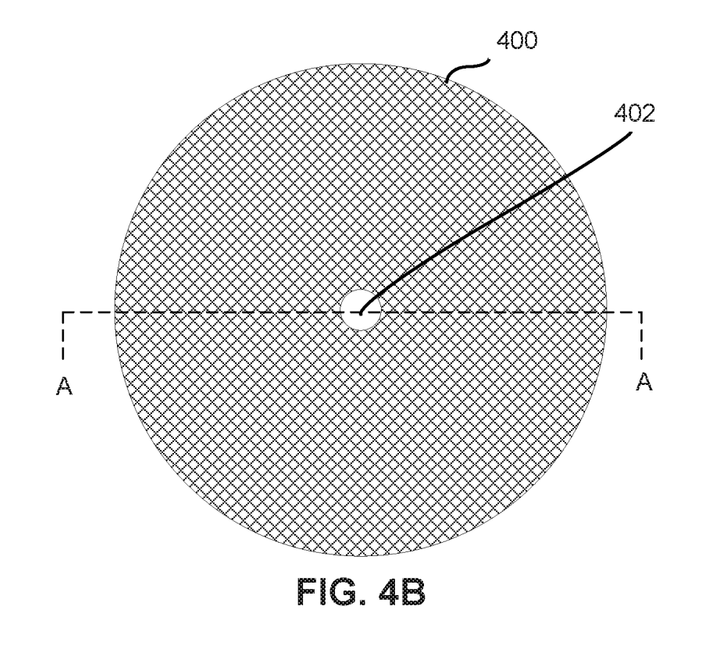
Figure 4C:
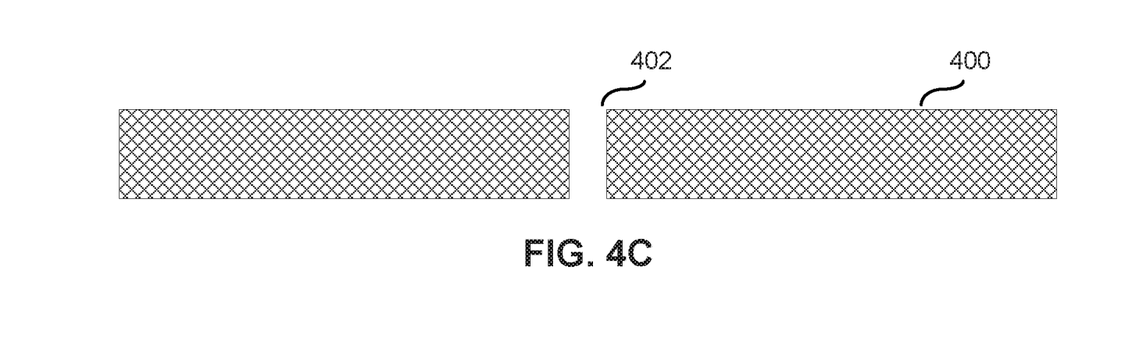

Next, an initial hole is formed in the orifice plate at operation 202, as illustrated in FIGS. 4B-4C. Traditional techniques, such as drilling and/or machining, may be inadequate for forming a hole, or opening, in the orifice plate with a very tight tolerance, e.g. at +/−300 Å or less, as often required in advanced semiconductor fabrication processes. Accordingly, subsequent operations involving generating a coating, e.g. a silicon oxide coating, and etching the coating to a desired thickness are used to produce a final hole, or opening, having a final area that is produced to very high accuracy.

Figures 5A, 5B:
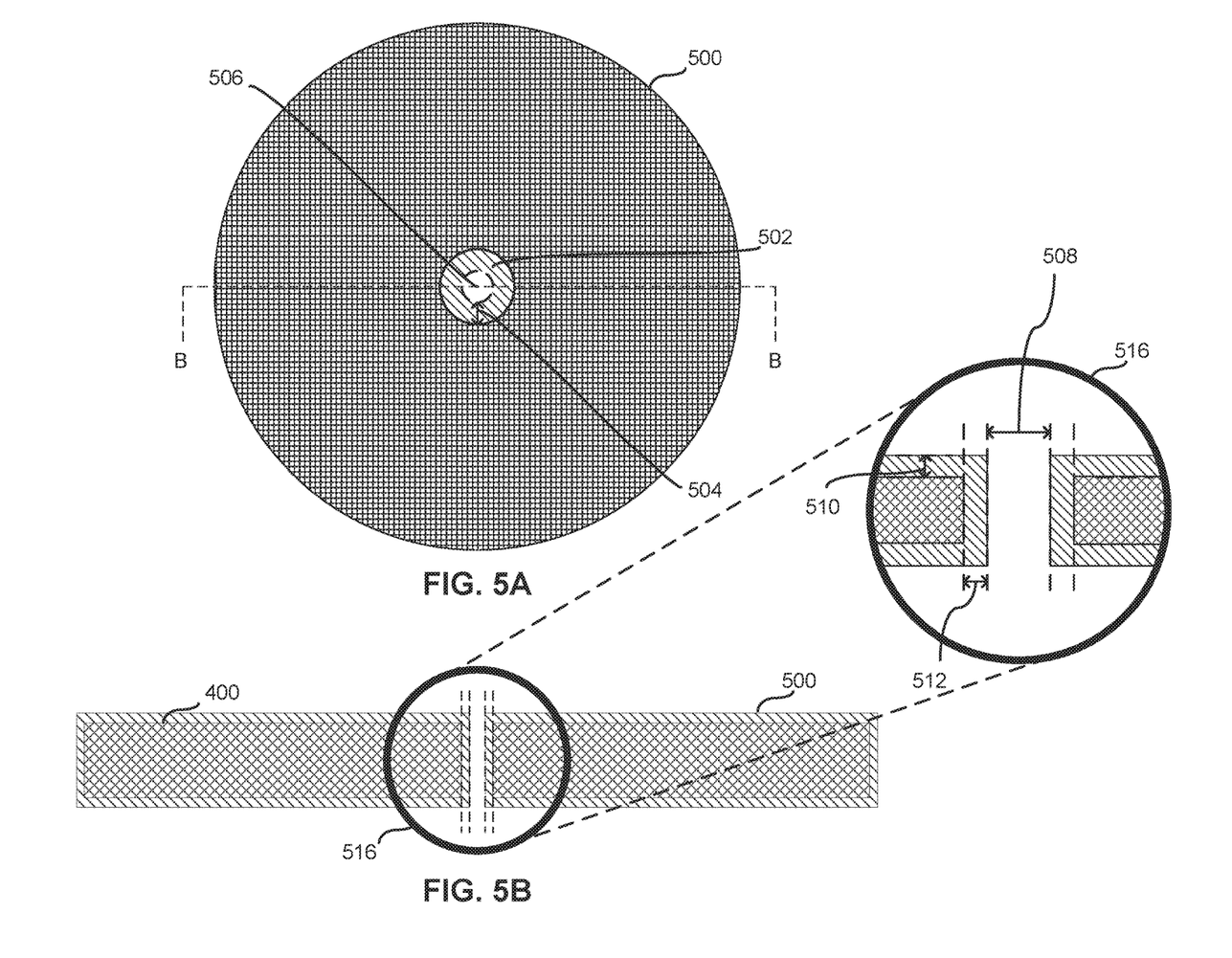
FIGS. 5A and 5B are top and side views, respectively, of an orifice plate with a coating generated thereon.

Next, at operation 204, a coating such as silicon oxide is generated on surfaces of the orifice plate via, e.g., an oxidation process such as thermal oxidation, to generate or grow a coating, e.g., coating 500 as shown in FIGS. 5A-5B, to reduce the cross-sectional area of the initial opening, e.g. to produce a reduced area opening. Dimensions of the reduced area opening are measured at operation 206 for reference in later operations.

Figure 6A:
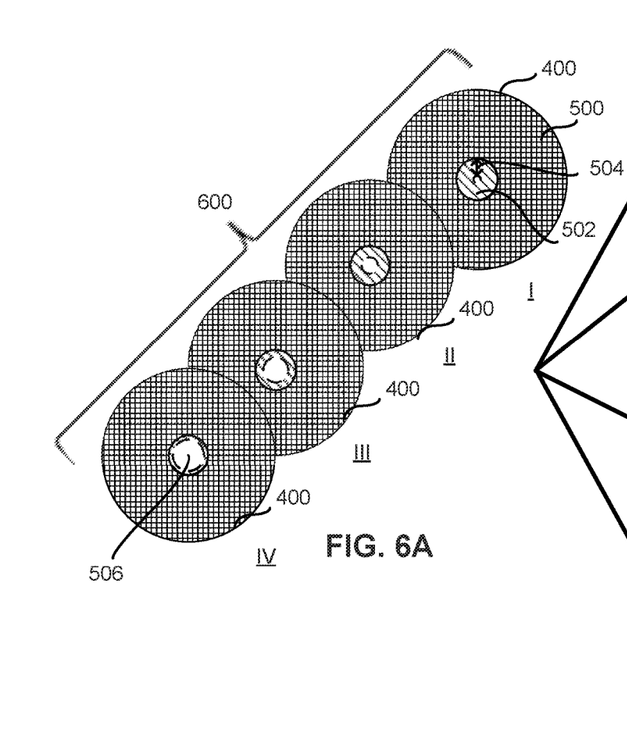
FIGS. 6A and 6B are schematic illustrations of the organization of orifice plates by the area of the orifice of each orifice plate.
Figure 6B:
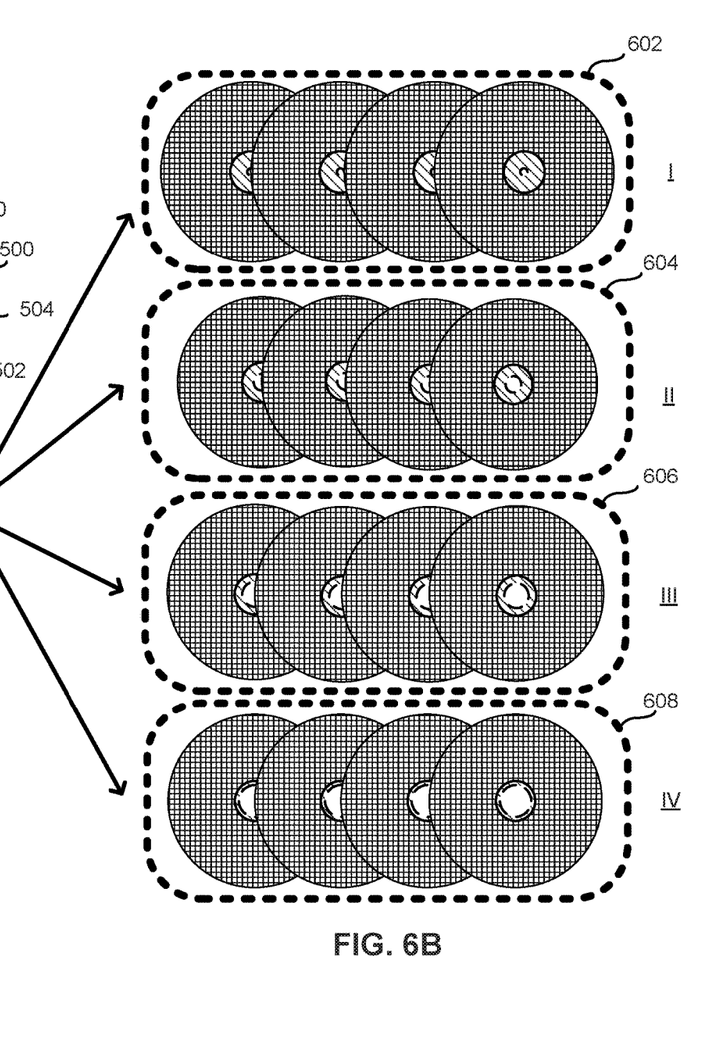

Multiple orifice plates may be optionally grouped, e.g. as shown in FIGS. 6A and 6B, according to their respective reduced area opening sizes at operation 208 to expedite subsequent etching operations, if necessary, to achieve a desired final opening diameter, or area. The amount of coating to be removed via an etch process, e.g. wet or dry etch, is determined at operation 210 dependent on that measured at operation 206.

Next, each orifice plate is etched to remove the determined amount of coating at operation 212. See FIG. 7B. Thereafter, a decision operation 214 assesses whether a sufficient amount of coating has been removed. If the outcome of operation 214 is "yes", then the process concludes; however, if the outcome is "no", then the process reverts via operation 216 to operation 204 to iteratively generate and etch a further coating as needed to achieve a final reduced area opening of a desirable diameter or width, e.g., akin to that shown in FIGS. 8A-8C described below.

Formation of an Orifice Plate and an Initial Hole Therein

Figure 3A:
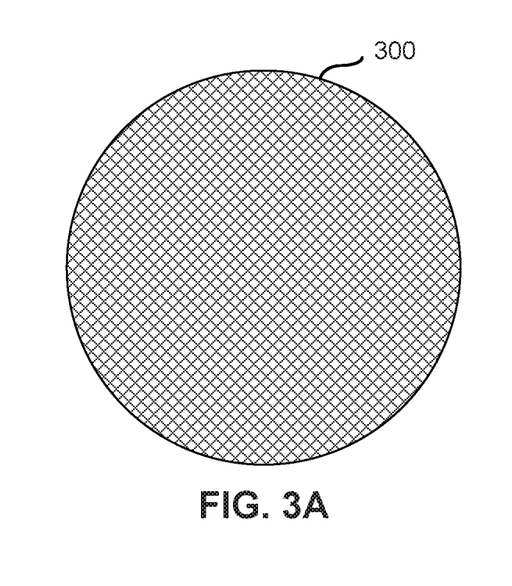
FIGS. 3A-3C are schematic illustrations of the formation of an orifice plate.
Figure 3B:
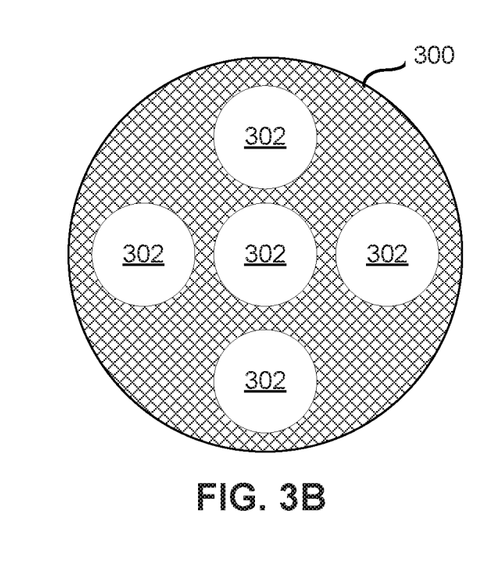
Figure 3C:
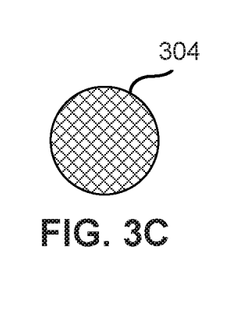

Referring now to FIGS. 3A-3C, an exemplary process for forming an orifice plate is shown. Substrate 300, comprising a suitable material resistant to chemical degradation such as Si, is cut to produce one or more round discs 304 as shown in FIG. 3C, leaving cutouts 302 in substrate 300 as shown in FIG. 3B. Substrate 300 may be laser cut, chemically or reactive-ion-etched (RIE), machined, etc. to produce disc 304. Although specific formative techniques are mentioned, one skilled in the art will appreciate that a wide range of techniques may be employed to cut or to otherwise change the dimensions of the raw or unprocessed substrate 300 to desirable dimensions of disc 304 or other structure produced to include opening 160, as shown in FIG. 1, for example. Next, disc 304 is penetrated to cut a hole of approximately a desired diameter, or width, to produce orifice plate 158, as shown in FIG. 1, or orifice plate 400, described in further-detail in FIGS. 4A-4C.

In certain embodiments, substrate 300 is a wafer or other slice cut from a single crystal of silicon (e.g., a 300 mm crystal of silicon). In some embodiments, substrate 300 may be shaped to have a substantially circular cross-section as shown in FIG. 3A. The substrate 300 may have a uniform length and height and be relatively thin, in comparison. A limited depth or thickness of disc 304 may be well suited for installation. The desirable thickness of substrate 304 may depend on the intended final application of the orifice plate 130 formed from disc 304. As an example, such as in the case of orifice plates 300 installed in MFC as disclosed herein, the thickness of each orifice plate 130 or 300 may be in the range of approximately 400 µm to 600 µm. Further, each disc 304 produced upon cutting of substrate 300 may have a diameter, or width, in the range of about 0.2 cm to 2 cm.

Note that cutting the orifice plates 158 from a substrate is optional, depending on the condition of the substrate 300. In certain embodiments, the substrate 300 is received in condition (e.g., size, thickness, shape) for forming the hole.

FIGS. 4A, 4B and 4C show top and side views, respectively, of an orifice plate 400 with an initial opening 402 formed therein. Traditional techniques for forming initial opening 402, such as by mechanical drilling, punching through the work piece, or even by using dedicated machinery and/or methods such as electric discharge machining (EDM) or laser machining may be used to form initial opening 402 with reasonable tolerance, e.g., diameter +/− about 5 microns. Such techniques may produce fluctuation from hole-to-hole due to various factors, within the noted tolerance, such as that caused by the optical and/or mechanical setups used to perform drilling operations. For instance, such setups may be subject to very slight variations in the orientation or angle of the mechanical setup of optical devices, e.g., lenses, mirrors, prisms, etc. In some embodiments, initial opening 402 is located at the center of orifice plate 400 across axis A-A as shown in FIG. 3B.

While initial opening 402 is depicted as having sharp edges (e.g., about 90 degrees between the opening's sidewalls and each of the plate's top and bottom surfaces), this need not be the case. In certain embodiments, the opening has a chamfered profile at one or both of the inlet and/or outlet sides (top or bottom). In certain embodiments, the opening is larger area at the inlet than the outlet. These variant designs (e.g., designs with a chamfered or variable diameter opening) may be used in applications where turbulence is minimized (applications that promote laminar flow) in gases flowing through the opening.

Figure 5C:
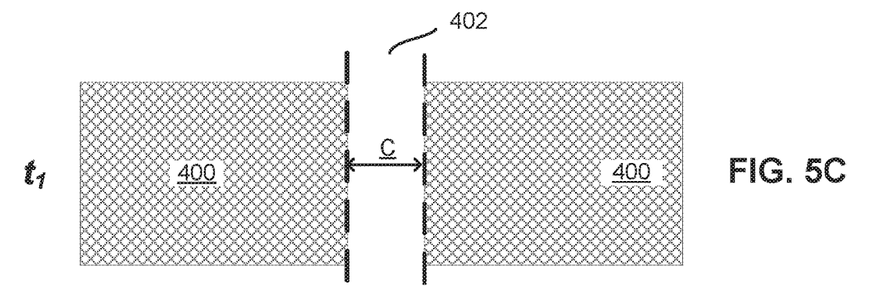
FIGS. 5C and 5D are schematic illustrations of the generation and subsequent etch of one or more layers of oxide coating on an orifice plate.

Traditional techniques may be insufficient to produce initial opening 402 with the degree of accuracy and precision often required for advanced semiconductor fabrication processes. Therefore, additional operations, e.g. as presented in FIGS. 5A-D and 8A-C may be implemented to produce a final opening, e.g. as shown by 708' in FIG. 7B, which in some examples has a diameter in the range of 50 to 1,800 microns. Drilling, for example, orifice plate 400 may form initial opening 402 with initial area, or width, C, as shown in FIG. 5C, which may be further modified through subsequent process operations to produce a final opening with a very high degree of accuracy and precision, such as to a tolerance of about +/−300 Angstroms ("Å") or less.

The initial hole may be measured by any of the techniques described herein. Using this information and subsequently collected information about the thickness of an oxide layer, one can determine how much oxide to etch away to arrive at the final hole of the desired dimensions.

Generating a Coating on the Orifice Plate

Referring now to FIGS. 5A-5B, a coating such as an oxide material-silicon dioxide ($SiO_2$) in the example—is produced by chemical reaction with exposed surfaces of orifice plate 400. Thermal oxidation is one example of a chemical reaction to create coating 500 on orifice plate 400. More generally, the chemical reaction may be one that is strongly diffusion limited such that the thickness of the resulting coating is essentially uniform regardless of the position or orientation of the surface wherein the coating forms. For example, the coating thickness may be substantially constant across the flat surface of a substrate plate and in sidewall of a hole. Thermal oxidation of silicon is an example of a strongly diffusion limited process. In various embodiments, the coating material has a greater volume than the substrate material it displaces, i.e., the substrate material consumed in the chemical reaction to make the coating.

$SiO_2$, produced via the thermal oxidation processes described herein, is grown in amorphous form with an approximate weight density of 2.2 $g/cm^3$, and an approximate molecular density of $2 \times 10^{22}$ $molecules/cm^3$. $SiO_2$ demonstrates favorable etching selectivity between Si and $SiO_2$ in, for example, wet etching. Wet etching, as further described herein, may be conducted by dipping orifice plate 400 with coating 500 generated thereon in an acid, e.g. hydrofluoric (HF), bath, to reduce the thickness of coating 500 down to a desired size, or thickness.

Oxygen chemically reacts with Si contained in orifice plate 400 to consume a quantifiable depth, e.g. a portion of thickness 510 as shown by enlarged area 516 of FIG. 5B, of orifice plate 400. As explained later, generation of oxide followed etching of the generated coating 500 with, e.g., hydrofluoric acid in water, generates and removes, respectively, coating 500 material to adjust the diameter, or width, of hole coating 502 with a high degree of accuracy and precision. Thus, in some embodiments, hole coating 502 may reduce the area, or diameter, 508 of reduced area opening 506 by specified thickness 512 and/or 510 as desired for certain applications.

Figure 5D:
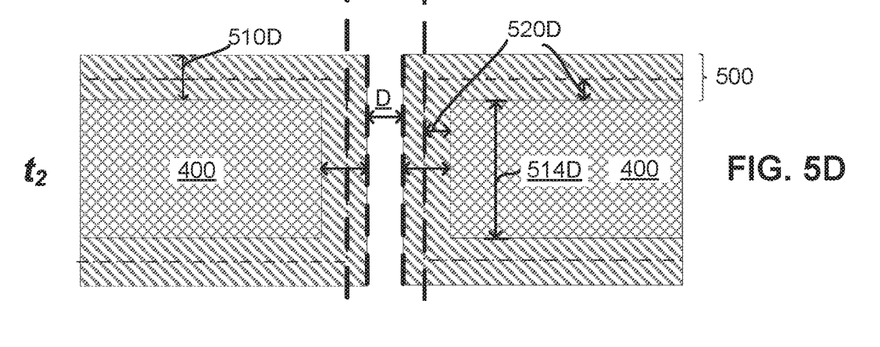

In various embodiments, coating 500 is generated, produced, or grown on and in orifice plate 400, by thermal oxidation, e.g., a chemical reaction that consumes some of the substrate material, e.g. Si of orifice plate 400 and produces $SiO_2$. In detail, growth of coating 500 at a height 510D, as shown in FIG. 5D, will consume a thickness 520D of silicon in orifice plate 300. Coating 500 will typically occupy a greater volume than the silicon of orifice plate 400 used to form it, e.g., in the case of pure thermal silicon oxide. Thus, the thickness of 510D should exceed 520D by a quantifiable amount, such as approximately 2.17:1. Also, processes used to generate coating 500 on orifice plate 400 are diffusion-limited processes, meaning that coating 500 will be produced isotropically, also referred to as non-directionally, in opening 506 and on the other portions of the surface of orifice plate 400 exposed to silicon dioxide. Thus, consumption of orifice plate 400 will occur uniformly within opening 508, as shown in FIG. 5B relative to the thickness of orifice plate 400, as shown by thickness 514D of FIG. 5D, for example. Such uniform consumption of Si by coating 500 and growth upon the consumed orifice plate 400 allows for efficient and accurate measurements of coating 500 grown in a direction perpendicular to the flat surface of orifice plate 400 to determine the restriction of opening D, as shown in FIG. 5D and opening F in FIG. 8B. In certain embodiments, standard metrology equipment such as various tools manufactured by Wirth Instruments and Mitutoyo may be employed as appropriate to conduct such measurements.

Thermal oxidation processes are well known to produce a thin layer of oxide, e.g. $SiO_2$, as described above onto a surface of a wafer or substrate, such as orifice plate 400. Traditional oxidation techniques force an oxidizing agent to diffuse into the wafer at a high temperature, e.g. such as between 950° C. to 1,100° C., resulting in a high-temperature oxide (HTO) layer. The oxidizing agent used may be either water ($H_2O$) vapor, e.g. provided as steam and molecular oxygen ($O_2$), and be referred to as wet or dry oxidation, respectively. As shown below, Eq. 1 represents wet oxidation and Eq. 2 represents dry oxidation:

$$Si + 2H_2O \rightarrow SiO_2 + 2H_{2(g)} \quad \text{(Eq. 1)}$$

$$Si + O_2 \rightarrow SiO_2 \quad \text{(Eq. 2)}$$

In some embodiments, either of the oxidizing agents presented above may also contain several percent of aqueous hydrochloric acid (HCl), where chlorine from the HCl acid removes metal ions that may occur in the oxide. As discussed earlier, thermal oxide growth involves consumption of Si from the substrate and oxygen supplied from the oxidizing agent, or ambient. In typical silicon thermal oxidation processes, for every unit thickness of silicon consumed from the substrate, e.g. orifice plate 400, approximately 2.17 unit thicknesses of oxide will form. Thus, if a bare silicon surface is oxidized, 46% of the oxide thickness will lie below the original surface, with the remaining 54% above it.

The Deal-Grove model may be used to mathematically describe the growth of an oxide layer on a surface of a material, such as silicon oxide grown on orifice plate 400 as described herein. The model assumes that the oxidation reaction occurs at the interface surface between the oxide and the substrate, rather than between oxide and ambient gas. Thus, the model considers three phenomena that the oxidizing species undergoes, in the following order: (1) diffusion of the oxidant from the bulk of ambient gas to the oxide-substrate interface surface; (2) diffusion through existing oxide to the oxide-substrate interface surface; and (3) reaction with the substrate at the oxide-substrate interface surface. The model assumes that each of the above stages proceeds at a rate proportional to the oxidant's concentration. Thus, applying each of Henry's law, Fick's law of diffusion, and a rate constant for a first-order reaction for stages (1) through (3), and solving appropriately, yields a quantifiable relationship, which describes thickness of the oxide layer as a function of time, t.

Returning to FIGS. 5A and 5B, enlarged section 516 of FIG. 5B shows phenomena occurring at opening 506 during thermal oxidation processes. Either wet or dry thermal oxidation may be employed to apply $SiO_2$ to form hole coating 502 at opening 506 upon reaction of the applied $SiO_2$ with Si of the orifice plate 400 (e.g., beneath coating 500 as shown in FIG. 5A).

Measurement and Etching of Coating

FIGS. 5C-D illustrate the sequential application of: ($t_1$) silicon oxide on orifice plate 400 to generate or grow coating 500 thereon, followed by ($t_2$) a measurement of coating 500 to determine the thickness 510D, as shown in FIG. 5D, extending beyond the original surface of orifice plate 400. If the thickness indicates that the reduced area hole is within an acceptable tolerance, processes will end with the structure shown in FIG. 5D, e.g. that diameter 508 of opening 506 is sufficient. However, as explained, additional processing, e.g., etching, of orifice plate 400 may be conducted to increase the size of the reduced dimension hold. In such cases, some or all of the coating is removed to widen the reduced area hole. If, after the material is removed, the resulting hole is still not large enough, one or more additional cycles of $SiO_2$ generation and etching may be completed, e.g. as described earlier by the flow chart of FIG. 2 and in FIGS. 8A-8C below.

Figure 7A:
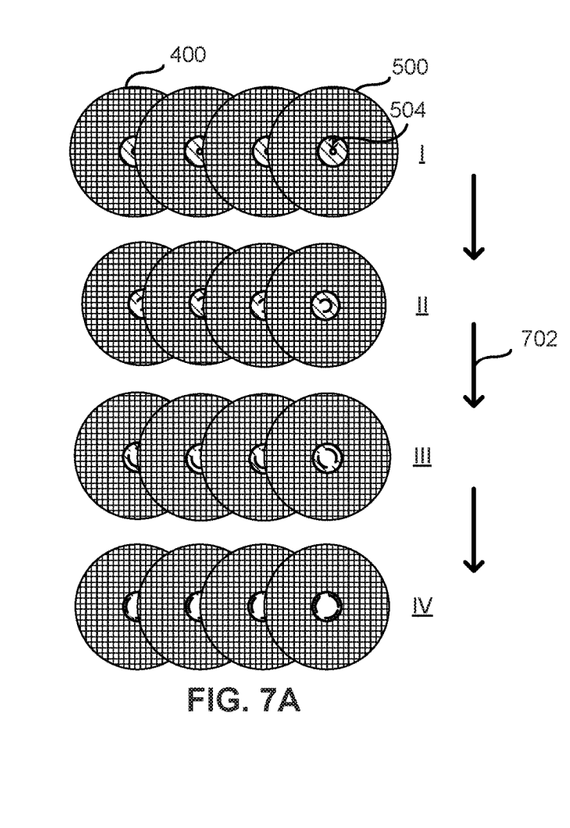
FIGS. 7A and 7B are schematic illustrations of top and side views, respectively, of optional additional cycles of coating application and/or etching to achieve a desired final orifice area.
Figure 7B:
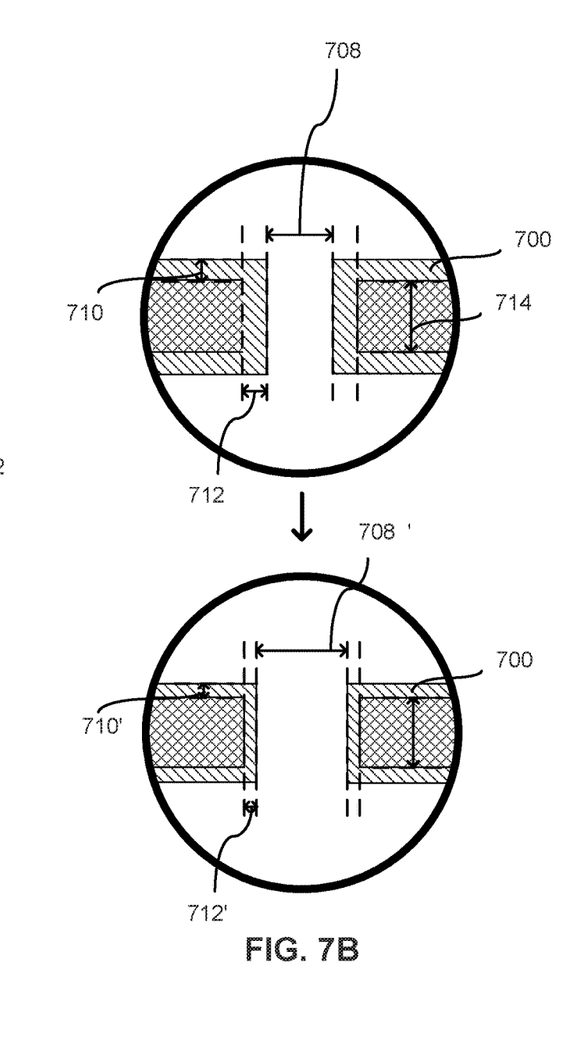

FIGS. 5D and 7B (top) show an orifice plate with a reduced area hole formed therein. To gauge the size of the reduced area hole, one may measure the thickness of the coating on a flat surface of the plate. As mentioned, this can be done with standard metrology equipment for measuring oxide film thickness in semiconductor device fabrication processes. The measurement may be taken in a direction perpendicular to the flat surface of orifice plate. With the thickness measured, one can determine the size of the reduced dimension hole. For example, the diameter of a circular hole will be the difference of the initial hole diameter and two times the measured thickness of the coating.

Should the resulting calculated (or directly measured) size of the reduced area hole be smaller than that desired, which it typically is, the coating may be etched by a determined amount to produce the desired final hole size. The thickness of coating to be etched away is determined by the difference in area or diameter between the desired hole size and the size of the reduced area hole. Considering diameter, an amount of coating equal to one half the difference should be etched away.

Wet or dry etch processes are generally well characterized in the art as being suitable for application to etch and remove silicon oxide coating growth on a silicon substrate, e.g. coating 500 on orifice plate 400. For instance, etch conducted in, for example, a reactor process chamber, may be conducted with very high degree of accuracy using particular etch processes tailored for particular coating materials, e.g. silicon oxide. An example of a wet etch for an amorphous silicon dioxide coating, such as is produced by thermal oxidation processes presented herein, is an aqueous hydrofluoric (HF) acid solution. Compositions of HF acid used to etch coating 400, e.g., silicon oxide on a silicon substrate often start with concentrated HF acid (e.g., about 49% by weight) and dilute it with deionized water to attain a desired etch rate. In certain embodiments, concentrated HF solution is diluted in a range of about 5:1 to 1000:1 (water to HF solution).

When applied to thermally generated silicon dioxide, aqueous HF acid solutions can be tailored to have extremely accurate etch rates over a wide range such as from about 3 Å per minute etch rate up to hundreds of A per minute. Typically, though not necessarily, the etch is performed at room temperature, e.g., about 23° C. Under tightly controlled conditions (e.g., temperature), the etch rate may be accurate to a level of about 0.1 Angstrom/minute (e.g., an etch rate of 5+/−0.1 Angstrom/minute). As introduced earlier, multiple orifice plates 400 can be etched together, provided that those orifice plates 400 have nearly identical hole opening areas or diameters and are grouped, or otherwise organized, accordingly. Such multiplexed processing can increase the throughput of the process.

The post-etch hole may be measured to determine whether it has a size required for the final hole. If such measure confirms that the hole has the desired size, the manufacturing process may be concluded. The post-etch hole may be measured by various types of measuring tools, including any tool able to measure area, or at least a dimension thereof, with a very high degree of accuracy. For instance, a tool used to measure area should be able to conduct measurements within approximately 400 Å of the actual diameter or within about 300 Å of the actual diameter, or within about 200 Å of the actual diameter. Also, because methods of forming initial holes sometimes create noncircular holes, the measuring technique should be able to measure dimensions or areas of non-circular, e.g. oval, holes with little or no loss of accuracy. In certain embodiments, the measuring tool measures the area of the hole opening directly. In cases where the measuring tool can measure only the diameter or other one-dimensional characteristic of the opening, the tool may make multiple measurements at different angles around a center or centroid of the opening.

Examples of tools that may be employed to measure the hole opening dimension or area include tools rely on optical technologies, as well as tools that rely on electron microscopy such as scanning electron microscopy (SEM), transmission electron microscopy, etc., and other tools that rely on atomic force microscopy.

An example of a tool suitable for configuration to measure the area of a post-etch hole is the Wirth or Mitutoyo which has a resolution of approximately +/−0.000039 times the actual diameter measured. For example, for a 500 µm diameter opening, the Wirth or Mitutoyo may provide a resolution of approximately +/−20 nm (i.e., +/−200 Å).

Figure 8A:
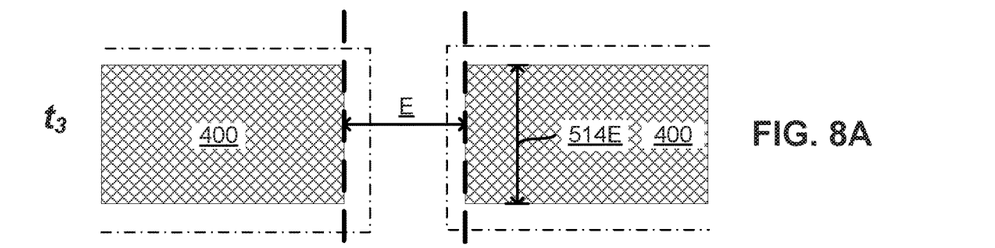
FIGS. 8A-8C are schematic illustrations of one or more optional additional iterations of generation and subsequent etch cycles of one or more layers of oxide coating on an orifice plate.
Figure 8B:
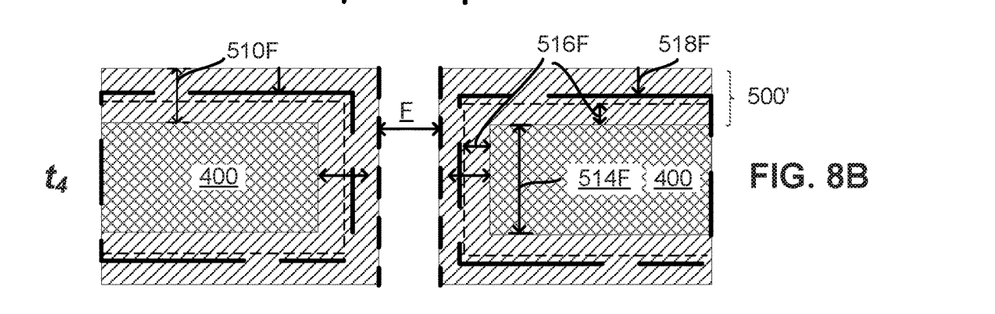
Figure 8C:
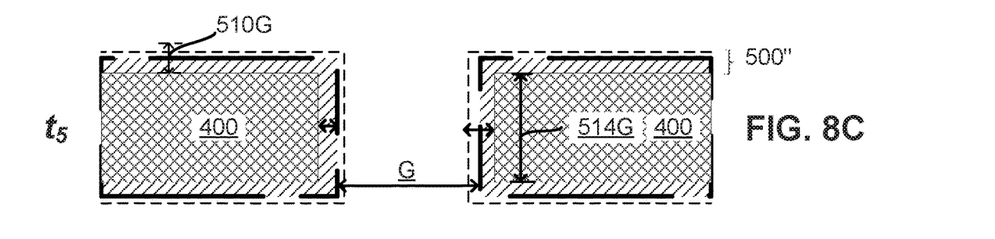

Any or all of the tools and/or techniques discussed above with relation to the measurement of the dimensions, or the area, of area or width of a post-etch hole may be adapted for subsequent incremental measurement of shrinking or expanding areas of the hole. Such measurement may be conducted as appropriate for the application, re-application, and/or etching of coating 500 (and/or 500', 500", etc.) to achieve a particular width or area of hole coating 502, of specified width or thickness 512, as shown by FIGS. 5A and 5B. Namely, cycles of (1) application of silicon oxide to produce coating 500 followed by (2) exposure to aqueous HF acid to etch coating 500 down to a desired size, e.g. as shown by FIGS. 8A-8C may be repeated as many times as desired to arrive at a final area G, as shown in FIG. 8C, which corresponds to a final or desired hole coating 502. Measurements may be taken at each application or etching operation. For example, after an initial measurement of area C, $SiO_2$ may be applied to partially consume thickness 514D, as shown in FIG. 5D, of orifice plate 400 to grow at a thickness 510D thereon. Measurements may then be taken of the reduced opening 402, or hole coating 502, to determine whether the opening 402 has been sufficiently reduced to match a desired input within an acceptable tolerance limit, e.g. +/−5 µm.

Organization of Orifice Plates by Opening Size

As shown in FIGS. 6A and 6B, and in FIGS. 7A and 7B, collection 600 of orifice plates 400 having varying reduced area hole dimensions (sometimes caused by varying initial hole dimensions and/or coating thicknesses) may be grouped or "binned" based on their opening 506 diameters or areas. For example, orifice plates 400 having reduced area openings 506 in the range of, e.g., 491 to 495 µm are provided in one bin, e.g. bin "I" as shown in FIG. 6B, orifice plates with reduced hole opening diameter of 496 to 500 µm are provided in a second bin, e.g. bin "II" as shown in FIG. 5B, orifice plates with reduced diameter openings in the range of 501 to 505 µm are provided in a third bin, e.g. bin "III" as shown in FIG. 6B, and orifice plates with reduced area openings in the range of 506 to 510 µm are provided in a fourth bin, e.g. bin "IV" as shown in FIG. 6B. These binned orifice plates 300 can then be treated, e.g. etched via a wet etch or a dry etch process, together in a subsequent operation relative to the amount of coating 400 material desired for removal to achieve a specified opening 506 area or diameter. For example, in some embodiments, all of the orifice plates 400 in the first bin are processed together, e.g. etched and exposed to silicon oxide for one or more cycles as shown in FIGS. 5C-5D, and/or as shown in FIGS. 8A-8C. However, no orifice plates from the second, e.g. II, through fourth bins, e.g. IV, are included in the first bin during processing of the first bin. Similarly, all orifice plates in the second bin are processed together, but no orifice plates from any of the other bins are processed along with the orifice plates in the second bin during their processing.

In certain embodiments, orifice plates 400 organized by their reduced hole opening diameter, e.g. as discussed above, may be again exposed to thermal oxidation together at the same time and within, for example, a common reaction process chamber, to iteratively control opening 506 size, as illustrated in FIGS. 8A-8C. Thus, multiple orifice plates may be subject to identical coating growth conditions, and consequently demonstrate the same coating growth kinetics. For example, multiple substrates may have initial openings formed in them, where each initial opening may vary in cross-sectional area due to production variances. Nevertheless, all orifice plates having varying initial openings may be collectively coated in a common process chamber, such as a thermal oxidation furnace, to be subsequently categorized by hole opening area and re-processed accordingly. Conventional thermal oxidation chambers are known to be capable of forming thermal oxide on many substrates simultaneously.

Accordingly, processing of binned orifice plates may allow for the controlled expansion, or re-processing, of opening 506 by reducing thickness 504 for specific bins of orifice plates, as shown in FIG. 6A, to achieve desired and consistent opening diameters or areas. For example, bin I of orifice plates 400 having openings 506 with diameters in the range of 491 to 495 μm may be etched to a larger opening 506 diameter, such as 501 to 505 μm, and so on and so forth until a desired final opening diameter is attained. In certain embodiments, any one or more of bins I through IV may be iteratively re-processed as shown in FIGS. 8A-8C to achieve specific diameter 508 tolerances, if such diameters 508 are not otherwise achieved by a single generation of coating 500 cycle.

FIG. 7B shows incremental etch of coating 700 processes first shown and discussed for FIGS. 4C-4D and/or FIGS. 8A-8C. Orifice plate 400 may be exposed to silicon oxide via thermal oxidation, as discussed earlier, to uniformly grow coating 700 having height 710 substantially equal to width 712. Next, initial opening 708 may be measured post-generation or growth of coating 700 on orifice plate 400 to determine the precise amount of coating 700 desired for removal via etch processes, e.g. dry etch or wet etch. Accordingly, orifice plates 400 may be binned for subsequent iterations of exposure to oxide and etch of coating 700 grown thereof, as appropriate, to achieve desired a desired diameter for final opening 708'.

With regard to determinations of the quantity of coating 500, or 500', or 500", etc., etched, coating material to be removed is typically the coating that was formed in the immediately preceding step, e.g., as that shown in FIG. 8B, where coating 500 produced as shown in FIG. 5D is etched, etc. In certain embodiments, the amount of material to be removed is determined as the difference of a specification diameter (e.g., 500 μm) and the currently measured or calculated diameter of the reduced area opening (e.g., 496 μm), as shown in FIGS. 5C-5D and FIGS. 8A-8C, respectively. This difference represents twice the thickness of material that is to be removed. This is because material removal takes place equally over the entire perimeter of opening 506 as shown in FIG. 5A, e.g. both to the left and to the right from a center of opening 506. For example, removing 2 Å of material around the perimeter of opening 506 will increase the diameter by 4 Å. Assessing the difference between a desired input diameter or width of opening 506, e.g. made smaller by hole coating 502, and the current diameter taken via various metrological techniques as presented earlier, allows for precise control of the silicon oxide application, coating generation, and coating etching processes to attain the desired input diameter or width with great accuracy.

Multi-pass Coating and Etching Processes

As generally referred to earlier, in certain circumstances when generation of the coating and subsequent etching fails to produce a final hole having a sufficiently large opening diameter, additional processing of the orifice plate may be conducted. For example, even after all oxide is removed, opening E shown in FIG. 8A may be measured and found to be unacceptably small. In detail, the coating, e.g., coating 500 in FIG. 5D, may be optionally etched back the whole way to the underlying plate material at ($t_3$), as shown in FIG. 8A to produce a reduced orifice plate 400 thickness 514E and associated hole diameter E. Thereafter, silicon oxide is again grown on orifice plate 400 to, e.g., a thickness 500' shown in FIG. 8B. Similar to that shown in FIG. 5C, coating 500', shown in FIG. 8B, may further consume orifice plate 400, such that orifice plate 400 now has a reduced thickness of 514F. Finally, at ($t_5$), subsequent coating 500' may be etched to a desired thickness, e.g. final coating 500", shown in FIG. 8C. A hydrofluoric acid etch as described above may be employed.

One skilled in the art will appreciate that optional additional iterations of that shown in FIGS. 8A-8C, may be completed to produce a final hole opening with a desired area if, for example, two cycles of coating generation followed by etching to a desired coating thickness are insufficient.

CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. A method for creating a hole in an orifice plate, the method comprising:
   forming an initial hole in the orifice plate comprising a material,
      wherein the initial hole has an initial area;
   reacting the material of the orifice plate with a reactant to produce a coating and thereby produce a reduced area hole having a reduced area that is smaller than the initial area;
   measuring the reduced area hole; and
   removing a determined amount of the coating from at least the reduced area hole to produce a final hole in the orifice plate, wherein the reduced area is smaller than an area of the final hole,
      wherein the coating occupies a greater volume than the material consumed to form the coating.

2. The method of claim 1, further comprising installing the orifice plate in a gas box for supplying gases to a semiconductor device fabrication reactor.

3. The method of claim 1, wherein the material of the orifice plate is selected from the group consisting of: silicon, molybdenum, germanium, and tungsten.

4. The method of claim 1, wherein the material of the orifice plate is silicon and the coating comprises silicon oxide.

5. The method of claim 1, wherein forming the initial hole in the orifice plate comprises laser drilling the initial hole in the orifice plate.

6. The method of claim 1, wherein forming the initial hole in the orifice plate comprises mechanically drilling the initial hole in the orifice plate.

7. The method of claim 1, wherein the initial area is greater than the area of the final hole.

8. The method of claim 1, wherein reacting the material of the orifice plate with the reactant comprises performing thermal oxidation of the material of the orifice plate.

9. The method of claim 1, wherein the material is silicon and the coating is thermally grown silicon dioxide.

10. The method of claim 1, further comprising:
determining the determined amount of the coating using a difference between the reduced area and a specified area of the final hole.

11. The method of claim 1, wherein the final hole has a diameter of between about 50 micrometers and 1,800 micrometers.

12. The method of claim 1, wherein the final hole has a target diameter and wherein the final hole is produced with a variance from the target diameter of no more than about 400 Angstroms.

13. The method of claim 1, wherein the final hole has a variance from a target diameter of no more than about 250 Angstroms.

14. The method of claim 1, further comprising:
reacting the orifice plate resulting from (d) to produce a new coating and subsequently repeating operations (c) and (d) on the orifice plate to thereby increase the area of the final hole.

15. The method of claim 1, wherein removing the determined amount of the coating from at least the reduced area hole comprises conducting a wet etch of the coating.

16. The method of claim 15, wherein the coating comprises silicon oxide and the wet etch comprises contacting the coating with an aqueous hydrofluoric acid solution.

17. The method of claim 1, further comprising installing the orifice plate in a flow verification device for mass flow controllers.

18. The method of claim 17, wherein the material of the orifice plate resists chemical reaction with gases passing through the final hole.

19. The method of claim 18, wherein the gases are selected from a group consisting of: Ar, $BCl_3$, $C_2F_6$, $C_2H_4$, $C_4F_8$, $C_4F_6$, $CF_4$, $CH_2F_2$, $CH_3F$, $Cl_2$, CO, $CO_2$, COS, $H_2$, HBr, He, $N_2$, $NF_3$, $NH_3$, $O_2$, $SF_6$, $SiCl_4$, $SiF_4$, $SO_2$, Xe and $CF_3I$, and combinations thereof.

* * * * *